United States Patent [19]

Minami et al.

[11] 4,230,940
[45] Oct. 28, 1980

[54] AUTOMATIC FOCUSING APPARATUS

[75] Inventors: Masana Minami; Tomohide Watanabe, both of Kawasaki, Japan

[73] Assignee: Tokyo Shibaura Denki Kabushiki Kaisha, Kawasaki, Japan

[21] Appl. No.: 924,722

[22] Filed: Jul. 14, 1978

[30] Foreign Application Priority Data

Jul. 22, 1977 [JP] Japan .................................. 52-87271
Feb. 8, 1978 [JP] Japan .................................. 53-12367

[51] Int. Cl.³ .............................................. G01J 1/36
[52] U.S. Cl. .................................. 250/201; 250/204
[58] Field of Search ............... 356/1, 4; 250/201, 204, 250/209, 211 K; 354/25

[56] References Cited

U.S. PATENT DOCUMENTS

| | | | |
|---|---|---|---|
| 3,193,686 | 7/1965 | Heinz | 250/211 K |
| 3,562,538 | 2/1971 | Mergler | 250/204 |
| 3,649,840 | 3/1972 | Thorn et al. | 250/211 K |
| 3,721,827 | 3/1973 | Reinheimer | 250/201 |
| 3,798,449 | 3/1974 | Reinheimer et al. | 250/201 |

OTHER PUBLICATIONS

"Control Mechanism in the Philips VLP Record Player," Philips Tech. Rev. 33, 190–193 (1973), Janssen et al.

Primary Examiner—David C. Nelms
Attorney, Agent, or Firm—Oblon, Fisher, Spivak, McClelland & Maier

[57] ABSTRACT

An automatic focusing apparatus includes a lens for leading a laser beam onto a sample surface at a predetermined incident angle, a beam splitter to divide the reflected beam from the sample surface in accordance with the vertical shift thereof, a pair of photo diodes to respectively receive the divided beams and produce electric signals, a differential amplifier to produce a differential signal between the electric signals and a mechanism to vertically shift the stage by means of the differential signal to automatically focus a lens system on said sample surface.

15 Claims, 22 Drawing Figures

AUTOMATIC FOCUSING APPARATUS

BACKGROUND OF THE INVENTION

This invention relates to an automatic focusing apparatus including an optical system, more specifically to an apparatus best suited for automatic focusing of microscopes.

In conducting a microscopic inspection of a photo mask plate of an IC or LSI, a focal deviation may be caused when a stage is moved, which is attributable to the uneven planeness of the photo mask plate.

As automatic focusing apparatus for automatically correcting such focal deviation, there are conventionally known air-micro type apparatus which make use of air pressure.

According to one such air-micro type automatic focusing apparatus, the body tube of an objective of a microscope is transformed and given the function of an air nozzle, air is blown at a predetermined pressure against a sample placed on the stage, and the back pressure of the air is always kept constant, thereby automatically correcting the focal deviation. If it is assumed that the focus is properly adjusted with the back pressure at a value when the sample is located at a predetermined distance (e.g., 100$\mu$) from the air nozzle, the back pressure rises or falls as the sample approaches or goes away from the air nozzle with the shift of the stage (i.e., the focus is deviated), respectively. It is intended that the change in the back pressure be detected with a high-sensitivity pressure sensor, and that the objective be vertically shifted so as continually to keep the output of the pressure sensor constant, thereby maintaining the most correct focus.

The vertical shifting of the objective is performed by means of a motor system which operates in response to the output signal of the high-sensitivity pressure sensor.

These conventional automatic focusing apparatus, however, have various shortcomings as follows. That is, in the air-micro type automatic focusing apparatus, the body tube of the objective of the microscope is transformed into the air nozzle, so that there is required a special tube for the objective which must be provided with an air inlet portion for the air supply. Since the air inlet portion need be connected with an air hose, the mechanism surrounding the objective becomes large-sized and sophisticated, increasing the cost of production. In addition, replacement of the objective for the change of magnification requires operations to remove the air hose from the body tube and to attach it to a new one after the replacement, leaving a question with respect to the operation efficiency. In particular, this is not very convenient for example in the photo mask inspection which involves replacement of the objective for the change of magnification. Since the air nozzle must be supplied with compressed air, it is necessary to provide an air pump connected with the air hose. The compressed air is to be ejected from the air nozzle under a fixed pressure, and the pressure sensor to measure the back pressure is required to exhibit high sensitivity.

Moreover, in the air-micro type apparatus, focusing is achieved by vertically shifting the objective as aforesaid, part of the optical system of the microscope is to be shifted. Such partial shifting may, however, cause some deviation of the optical axis of the optical system of the microscope.

Furthermore, the air-micro type automatic focusing apparatus detects a change in the back pressure (i.e., focal deviation) by means of the pressure sensor, vertically shifting the objective in accordance with the result of such detection. Therefore, the shift mechanism must be coupled to the support member of the objective. Accordingly, the mechanism surrounding the support member of the objective becomes highly complicated. Moreover, the shifting is performed by using a motor, which must be mounted on the microscope, and thus the conventional construction of the microscope needs to be changed substantially. Supposed to measure the back pressure, the conventional focusing apparatus of the air-micro type have some other defects; extreme reduction in the detection sensitivity accompanying an increase in shift distance and a limited dynamic range.

Thus, the conventional automatic focusing apparatus are still subject to various shortcomings as regards the mechanism, operation efficiency, or dynamic range.

SUMMARY OF THE INVENTION

The object of this invention is to provide an automatic focusing apparatus to eliminate all the aforesaid shortcomings of the prior art automatic focusing apparatus, which enjoys a simple construction as well as a high operation efficiency, and is especially suited for microscopic inspection of photo masks or wafers of IC's or LSI's.

DETAILED DESCRIPTION OF THE PREFERRED EMBODIMENTS

Now there will be described the automatic focusing apparatus according to embodiments of this invention with reference to the accompanying drawings.

Figure 1:
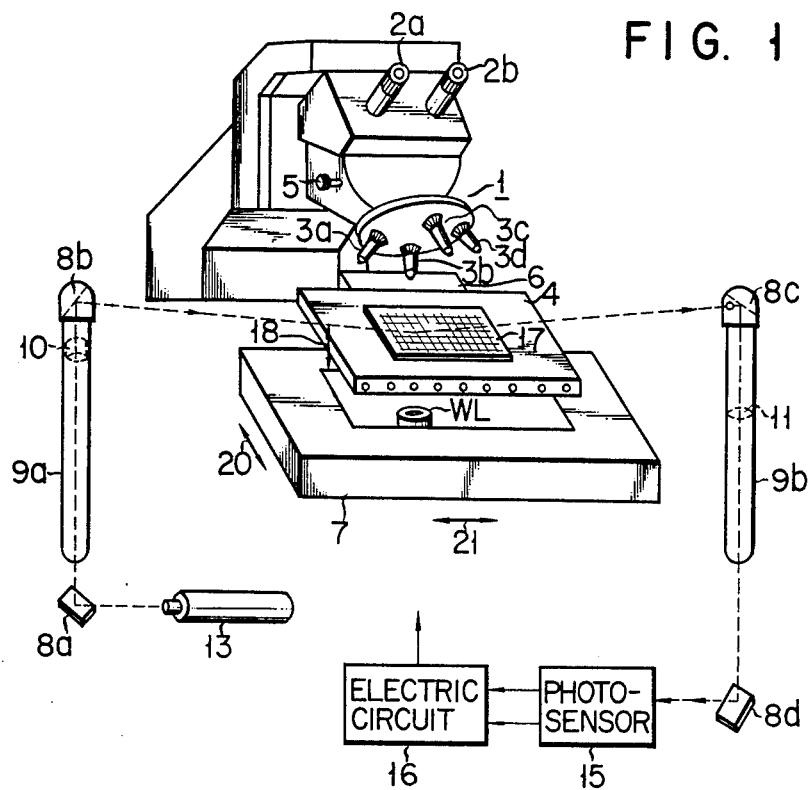
FIG. 1 is a schematic view of an automatic focusing apparatus according to an embodiment of this invention in combination with a microscope.

Referring now to the drawing of FIG. 1, which shows an outline of an embodiment of the automatic focusing apparatus of the invention, numeral 1 denotes a microscope which includes oculars 2a and 2b, objectives 3a, 3b, 3c and 3d, a stage 4, a focusing dial 5, and a white light source WL for illuminating a sample from the bottom. Except for the stage 4, the microscope according to the invention may be of the same construction as that of a conventional microscope. That is, as regards the main body of the microscope, the microscope of the invention differs from the conventional one only in that the stage 4 is so set as to be able to move up and down. The stage 4 is supported by a servomotor system 6 set behind, while the servomotor system 6 is provided to a support 7. The support 7 may be moved in directions of arrows 20 and 21, that is X and Y directions, by means of shift mechanism (not shown). The servomotor system 6 will be described in detail hereinafter. There are shown reflectors 8a, 8b, 8c and 8d, cylinders 9a and 9b, a cylindrical lens 10, and a spherical lens 11. Also shown are a laser beam source or an equivalent source of collimated light 13 (e.g., He-Ne laser), a photo-sensor 15, and an electric circuit 16 for detecting a focus shift distance from an electric output signal of the photo-sensor 15 and energizing a servomotor in the servomotor system 6 in response to the detecting signal.

A laser beam from the laser beam source 13 is led onto a sample surface 17 on the stage 4 through the reflector 8a, cylindrical lens 10, and the reflector 8b, and the reflected beam from the sample surface 17 is led to the photo-sensor member 15 through the reflector 8c, spherical lens 11, and the reflector 8d. Then, electrical signals (voltage values) corresponding to the quantities of light received are produced by two photosensitive elements of the photo-sensor 15. The electrical signals obtained by means of the two photosensitive elements are compared with each other by the electric circuit 16. Thus, the servomotor system 6 is energized by a resultant difference signal, and the stage 4 is moved up or down in response to such difference signal. Therefore, in a microscopic inspection, if the focusing dial 5 is first properly adjusted in advance to set the difference signal at zero, continually focused state may be maintained in spite of any subsequent focal deviation, because the stage 4 makes a minute movement in a direction to correct the focal deviation.

Figure 2:
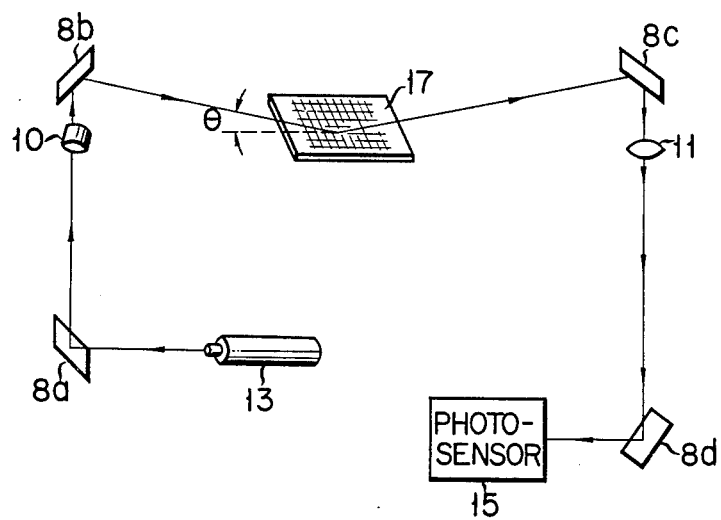
FIG. 2 is a detail view of a laser optical system of the automatic focusing apparatus as shown in FIG. 1.

FIG. 2 is a detail drawing for illustrating a laser optical system used with the apparatus of this invention. The beam from the laser beam source 13 is reflected substantially perpendicularly by the reflector 8a, and is introduced into the cylindrical lens 10, by which the beam is rectified to some degree. The cylindrical lens 10 renders the slit-like or flattened beam incident upon the sample surface 17, thereby avoiding speckle nozzle which may otherwise be caused by scattering on the sample surface. The beam which has passed through the cylindrical lens 10 falls upon the sample surface 17 at an incidence angle of $\theta$ through the reflector 8b. The incidence angle $\theta$ may range from 0° to 90°, preferably 3° to 10°. By setting $\theta$ at approximately 5°, the effect of the roughness of the sample surface 17 may be reduced, thereby enabling a detection of position with satisfactory S/N for an optional sample. This is an effective means for high-S/N detection for a sample with a relatively rough surface, such as a photo mask. The beam positively reflected on the sample surface 17 is led to the photo-sensor 15 through the reflector 8C, spherical lens 11, and the reflector 8d.

Figure 3:
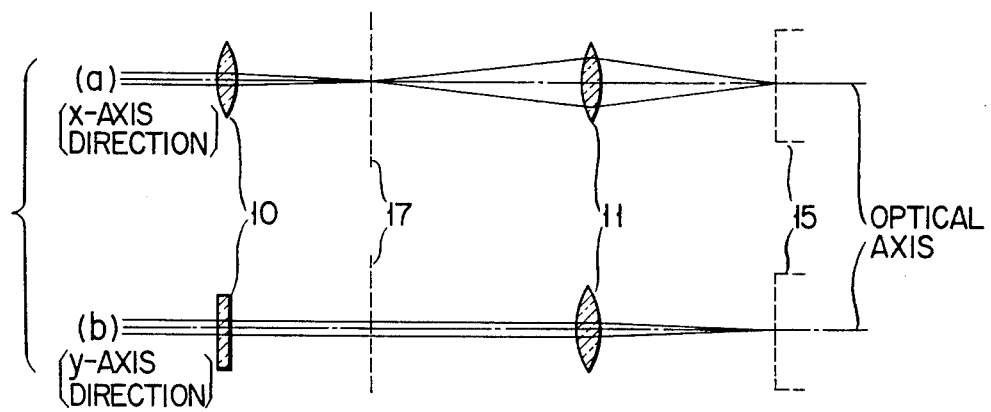
FIG. 3 shows the positional relation between the several elements of the optical system of FIG. 2 and the manner of change of a laser beam.

Referring now to FIG. 3, there will be described an example of the positional relation between the several elements of the aforesaid optical system and the menner of change of the laser beam. FIG. 3(a) illustrates the elements along the x-axis direction perpendicular to the optical axis, while (b) illustrates along the y-axis direction perpendicular to each of the optical axis and the x-axis. In this Figure, the reflectors 8a, 8b, 8c and 8d are not shown for the simplicity of illustration, and the sample surface 17 and the reflection thereon are simplified. The lens 11 is located between the sample surface 17 and the photosensitive surface of the photo-sensor 15 so as to image the point on the sample surface illuminated by the laser beam onto the photosensitive surface.

The spherical lens 11 is positioned substantially at the center of a region lying between the sample surface 17 and the light-receiving plane of the photosensor 15, thereby causing a light to be imaged onto said light-receiving plane. The reason is that if the imaged point on the light-receiving plane of the photosensor 15 is shifted only by the vertical movement of a sample (that is, the displacement of said focal point), then it is possible to prevent the inclination of the sample surface from occurring as the displacement of a focal point on the light-receiving plane of the photosensor 15.

By thus locating the lens 11, sample surface 17, and the photo-sensor 15, sufficient reflected beam from the sample surface 17 may be condensed onto the photosensitive surface of the photo-sensor 15.

Figure 4:
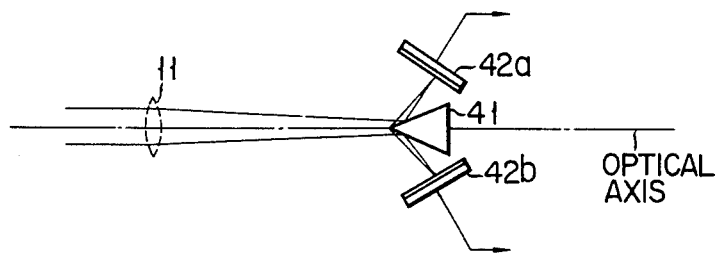
FIG. 4 shows the relation between a photo-sensor member of the optical system and the laser beam incident thereupon.

FIG. 4 shows an example of the photo-sensor 15 as well as the way the laser beam falls upon the photo-sensor 15 in adjusting the focus. In FIG. 4, numeral 41 designates a prism mirror, and numerals 42a and 42b denote photosensitive elements desposed at regular intervals on each side of the prism mirror 41. The prism mirror 41 is an isosceles prism which has the base set at right angles to the optical axis of the incident laser beam and the two legs forming surface mirrors. The pair of photosensitive elements 42a and 42b may be formed of photo diodes, such as PIN diodes.

As shown in FIG. 4, the incident laser beam, in focus adjustment, is divided into two equal parts by means of the prism mirror 41 to be led to each of the photosensitive elements 42a and 42b, so that the electrical output signals of the elements 42a and 42b will become identical with each other.

Figure 5:
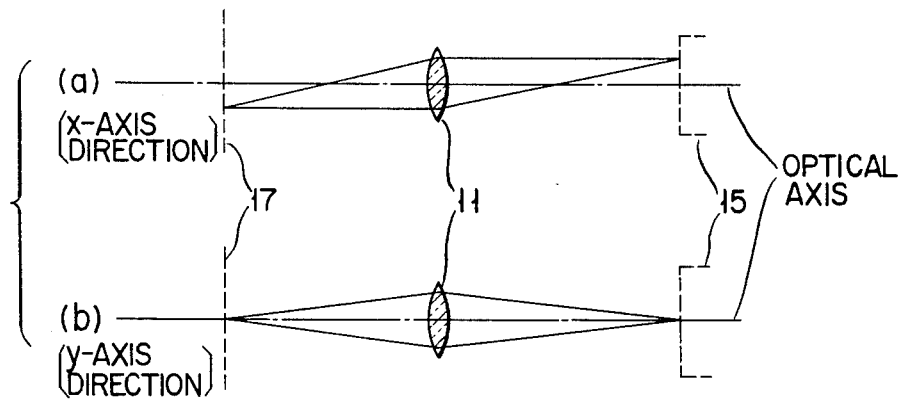
FIG. 5 is a diagram corresponding to FIG. 3, in which the sample is shifted in the vertical direction.

Referring now to FIG. 5, there will be described a case where the sample surface 17 is shifted upward or downward, as in FIG. 2, from the normal position. Vertical shifting of the sample surface 17 means that the reflected beam from the sample surface 17 falls upon the spherical lens 11 at a position deviated in the x-axis direction. Further, the reflection, from the sample surface 17, of the beam incident upon the spherical lens 11 falls upon the photo-sensor 15 in such a manner as shown in FIG. 5. That is, the incidence position on the prism mirror 41 varies from that of FIG. 3 only with respect to the x-axis direction.

Figure 6:
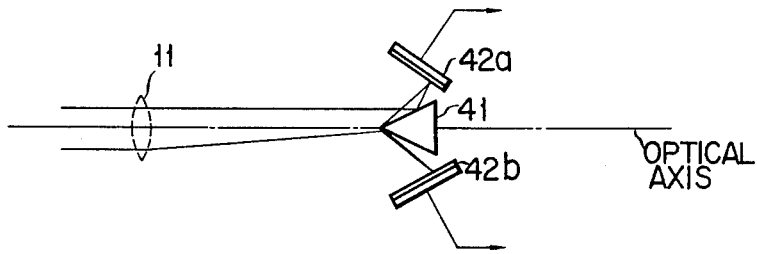
FIG. 6 is a diagram corresponding to FIG. 4 showing the manner of shifting of the laser beam incident upon the photo-sensor member in response to the shift of the sample as shown in FIG. 5.

FIG. 6 shows how the laser beam falls upon the photosensor 15 in the state of FIG. 5. If the focus is deviated as illustrated, the incident laser beam branches off with larger part led to one lateral surface of the prism mirror 41 and smaller to the other. Thus, there may be caused want of balance in the quantity of light received between the pair of photosensitive elements 42a and 42b.

If the sample surface 17 or the stage 4 is unexpectedly shifted in the direction as indicated by the arrow 18 of FIG. 1 while in its movement in the X- and Y-axis directions to cause false adjustment of the focus on the sample surface 17, then imbalance will be induced between the laser beams incident upon the two lateral surfaces of the prism mirror 41 of the photo-sensor 15. Consequently, the output of the photosensitive element to receive the reflected light from one lateral surface of the mirror 41 upon which the larger part of the laser beam is incident will become larger, while the output of the photosensitive element to receive the reflected light from the other lateral surface will be reduced.

Since the photosensitive elements 42a and 42b are arranged in the vicinity of the prism mirror 41 with an inclination thereto so as directly to receive any incident laser beam missing the surface of the mirror 41, any substantial deviation of the focus can be corrected.

Figure 7A:
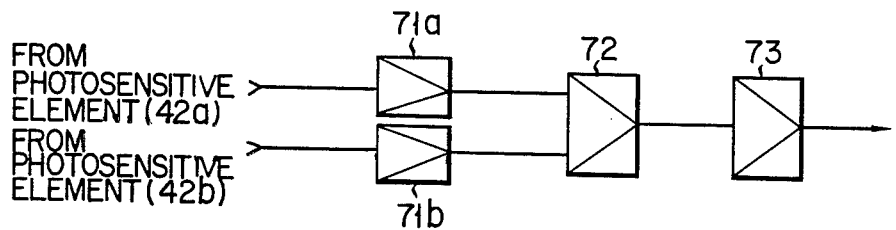
FIG. 7A is a block diagram of an example of the electric circuit used with the apparatus of FIG. 1.

Thus, the electrical signals given by the pair of photosensitive elements 42a and 42b of the photo-sensor 15 are applied to the electric circuit 16. FIG. 7A shows an example of the electric circuit 16. The respective output signals of the photosensitive elements 42a and 42b are amplified by pre-amplifiers 71a and 71b, and then applied to a differencial amplifier 72 connected to an output-amplifier 73.

Figure 7B:
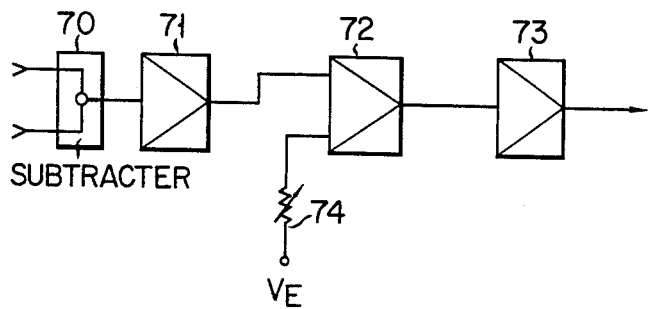
FIG. 7B is a block diagram of an alternative example of the circuit as shown in FIG. 7A.

FIG. 7B shows an alternative example of the electric circuit 16. The difference between the respective outputs of the photosensitive elements 42a and 42b is obtained by means of a subtracter 70, and resultant output is applied to one input terminal of the differencial amplifier 72 through a pre-amplifier 71. A power source $V_E$ is connected to the other input terminal of the differencial amplifier 72 through a variable resistor 74. The output upon the adjustment is to be set at zero by adjusting the variable resistor 74. Thus, the focus correction may be achieved by such adjustment if the objective is replaced while in inspection.

Figure 8:
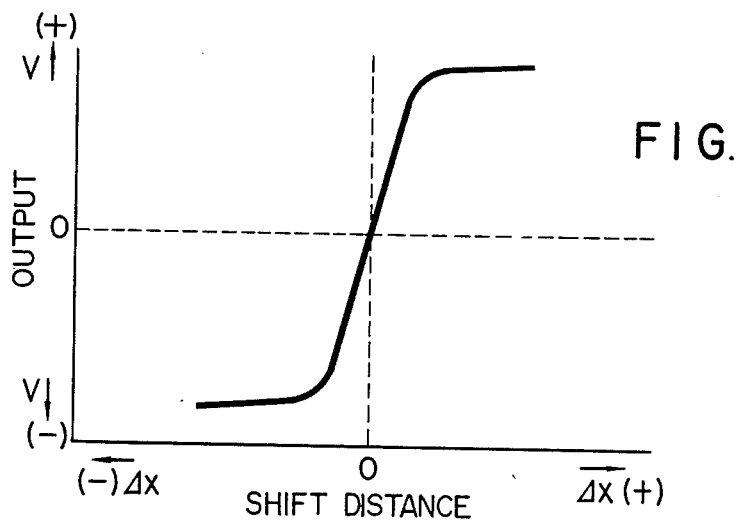
FIG. 8 shows the relation between the output of a differential amplifier of the apparatus of FIG. 1 and the sample shift distance.

FIG. 8 shows the relation between the vertical shift distance of the sample surface 17 (focal deviation) and the output of the differencial amplifier 72. The abscissa represents the shift distance $\Delta x$, while the ordinate stands for the value of output voltage of the differencial amplifier 72. As may be seen from FIG. 8, the output of the amplifier 72 changes drastically with high linearity in a section where the focal deviation is small.

Accordingly, when the stage 7 is horizontally shifted for the shift of the visual field of the microscope, involving a focal deviation, the output voltage of the differencial amplifier 72 varies in accordance with the characteristic as shown in FIG. 8, and is applied to the output-amplifier 73.

Subsequently, the output signal of the output-amplifier 73 is supplied to the servomotor of the servomotor system 6 of FIG. 1, which rotates in response to the output of the amplifier 73, therby shifting the stage 4 upward or downward over a predetermined distance.

Figure 9:
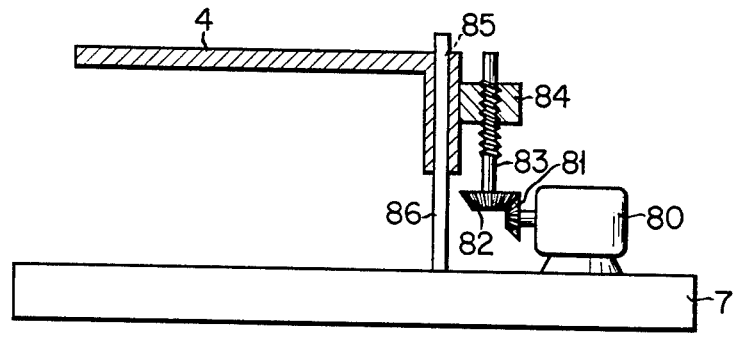
FIG. 9 is a sectional view of a mechanism for vertically shifting the stage.

FIG. 9 is a partially brocken side view showing an example of the manner of setting the servomotor system 6. Numeral 80 designates a servomotor mounted on the support 7, a bevel gear 81 being attached to the rotary shaft of the motor 80. The gear 81 is meshed with another bevel gear 82 fixed to the lower end of a vertical shaft 83. The vertical shaft 83 is externally threaded, engaging an internal thread inside a vertical perforation which is formed in a support member 84 protruding from the stage 4. Vertically formed in the stage 4 is a guide hole 85, in which a guide shaft 86 with the lower end borne on the support 7 is inserted. The guide shaft 86 and the guide hole 85 have a key and a key way, respectively, formed thereon, and thus the stage 4 is guided by the guide shaft 86 so that it can slide vertically and cannot rotate.

Thus, the servomotor 80 is driven in response to a signal supplied from the output-amplifier 73 to rotate the rotary shaft of the motor 80. By the rotation of the rotary shaft, the vertical shaft 83 is rotated through the paired reduction bevel gears 81 and 82, thereby finely vertically moving through the support member 84 the stage 4 which is prevented from rotating by the guide shaft 86.

In the apparatus of the above-mentioned embodiment, the laser beam is applied to the sample surface, the amount of focal deviation is detected making use of the reflected light, and correction of the focal deviation is achieved by vertically shifting the stage. Therefore, the objective of a conventional microscope may be used as it is without transforming the surface of the objective, unlike the case of the prior art air-micro type automatic focusing apparatus. Since there are needed none of the air inlet, air hose, etc. that essential to the prior art apparatus, the mechanism surrounding the objective may become quite simple in construction, thereby enabling miniaturization of the apparatus. Moreover, the objective is not processed at all, so that the operation for replacing the objective to change the magnification is very easy, requiring no such troublesome operations as the removal and replacement of air hose that are needed for the conventional air-micro type. Further, in the automatic focusing apparatus of the invention, the mechanism for detecting the focal deviation is formed of a combination of a laser beam source and an optical system thereof, photosensitive elements, and a simple electric circuit. Therefore, such mechanism may be substantially smaller than that of the conventional air-micro type which includes a combination of a nozzle obtained by transforming an objective, a hose for supplying air, an air pump for feeding compressed air, a pressure sensor for measuring back pressure, etc. Furthermore, according to the invention, the focal deviation is to be detected after the roughness of the sample surface is compensated by applying the laser beam diagonally to the sample surface at a predetemined angle, so that high-accuracy detection may be achieved even for a sample with relatively rough surface, such as a photo mask. Further, according to this invention, the spherical lens 11 is set in between the sample surface 17 and a pair of photosensitive members 42a, 42b and the light-receiving plane of the photo-sensor 15 thus the point, where the laser beam intersects the sample surface 17, is imaged onto the photosensitive members 42a, 42b. Accordingly, the imaged point on said light-receiving plane is changed only by the vertical shift of the stage, thereby preventing the inclination or the deformation of the sample surface from appearing as the displacement of the imaged point on the photosensitive members. Therefore, even the inclination of the sample surface resulting from the feed of the stage does not effect the automatic focusing function.

Since the reflected beam from the sample surface is condensed onto the photosensitive surface of the photosensitive element by means of the lens 11, the photosensitive surface may receive a sufficient quantity of light. Accordingly, a satisfactory accuracy of detection may be secured with a photosensitive element formed of a conventional photo diode. Moreover, according to the invention, the output of the photo-sensor is supplied to the electric circuit, and an output corresponding to the focal deviation is obtained by means of the electric circuit, and is supplied to the servomotor system for the vertical movement of the stage. Therefore, unlike the air-micro type apparatus, the objective side will not be moved, so that it may be of immobile construction. Thus, there will not be caused any deviation of the optical axis of the optial system of the microscope. Further, the focal deviation of the microscope, at detection, is converted into a shift of the optical path of the laser beam, so that the dynamic range may be set wider as compared with the case of the air-micro type.

Furthermore, in detecting the focal deviation by the shift of the optical path of the laser beam, the laser beam reflected on the sample surface is divided into two parts with a prism mirror, the two divided parts of the laser beam are received by a pair of photosensitive elements, and the focal deviation is detected from the difference between the two quantities of light received. Consequently, if the quantity of the applied laser beam or the reflected laser beam from the sample is changed due to various disturbances, it will never affect the detection of the focal deviation.

Meanwhile, the vertical shifting of the stage for the focus adjustment is performed by means of the servomotor system. In doing this, the stage is supported on one side, as shown in FIG. 9. Therefore, stable automatic focus adjustment may be secured with only a slight inclination of the plane of the stage accompanying the vertical shift thereof.

Moreover, the photo-sensor is so constructed that even a substantially large focal deviation may be corrected, not to mention a small one. Therefore, focus adjustment can securely be performed even if an external force is applied to the stage during the operation to shift the focus.

In the aforementioned embodiment, the microscope is of a type according to which the sample is illuminated from under the stage by means of a white light source. However, if the sample, unlike the photo mask of an IC or LSI, has no light transmissibility as is the case with a wafer, it may be irradiated from above the stage, and the reflected light may be observed through the objective.

On the other hand, if the sample has light transmitting capability, like the photo mask, a green incoherent light, which is prepared by applying a green filter to the white light source WL as shown in FIG. 1, for example, may be applied to the sample from under the stage. Further, e.g. a red coherent light given by a laser beam source (e.g., He-Ne laser) may be applied to the sample along the same optical axis of the incoherent light. This method is described in detail in a prior application by the the applicant hereof (Japan Pat. Appl. No. 1974-102,993). According to this method, a space filter is inserted in the body tube of the objective, though the tube itself requires no reconstruction.

Referring now to FIGS. 10 to 18, there will be described the automatic focusing apparatus according to another embodiment of this invention. In these Figures, substantially the same parts as those of the apparatus of the aforementioned embodiment are denoted by like reference numerals, and are excluded from the detailed description hereinafter.

Figure 10:
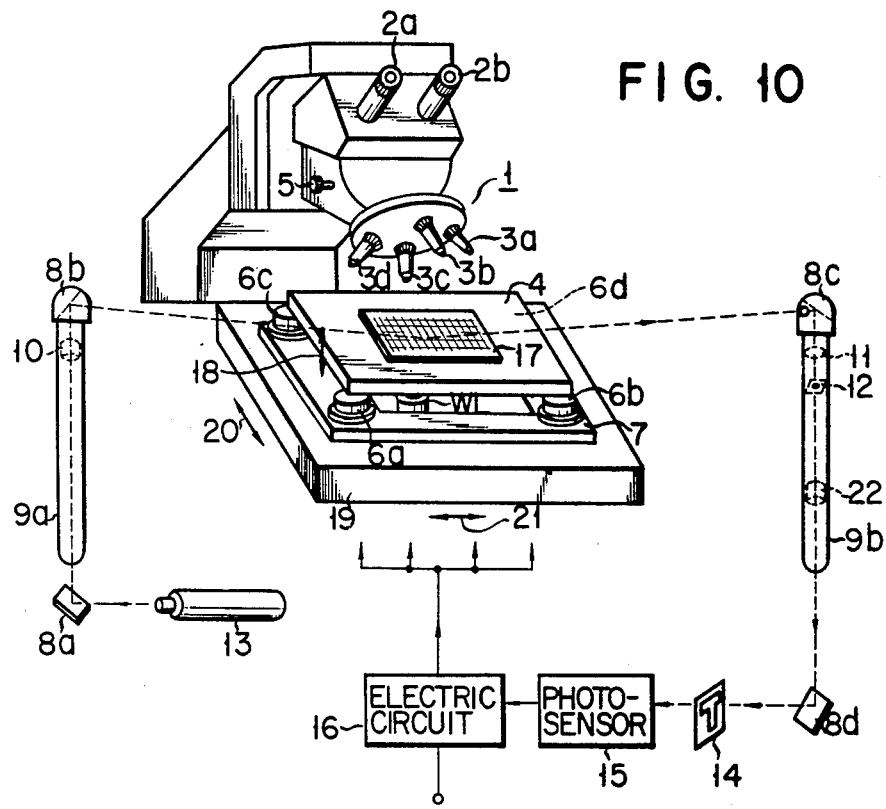
FIG. 10 is a schematic view of an automatic focusing apparatus according to the other embodiment of this invention.

In FIG. 10, the optical system of the automatic focusing apparatus to receive the reflected light from the sample surface further includes a slit 12 to receive the light from the spherical lens 11, and a cylindrical lens 22 for unidirectionally converging the light from the slit 12, which are received in the cylinder 9b. Outside the cylinder 9b, a slit 14 with a T-shaped opening is interposed between the photo-sensor 15 and the reflector 8d so that the light from the cylindrical lens 22 may pass through the slit 14 through the reflector 8d. As indicated, the slit 14 and photosensor 15 are arranged apart from each other. Actually, however, the light-receiving plane of the photo-sensor 15 is set close to the light-emitting side of the slit 14. The electric circuit 16 is connected with four jacks 6a to 6d instead of the servomotor system. These jacks are disposed under the four corners of the stage 4, and fixed by a base 19. Since the base 19 is so designed as to be shifted by a suitable means in one direction (X-axis direction) and another direction (Y-axis direction) perpendicular thereto, the sample 17 may be shifted horizontally through the stage 4. A mechanism such as jacks for vertically shifting the stage 4 composed of these jacks is driven by the electric circuit 16. As for an example of such circuit, it may be of substantially the same type as the one used in the apparatus of the aforementioned embodiment, as shown in FIG. 7B. In this example, however, the subtracter is not needed, and an electrical signal corresponding to the quantity of light having passed through the slit 14, which is produced from the photo-sensor 15, is supplied directly to the pre-amplifier 71.

Figure 11:
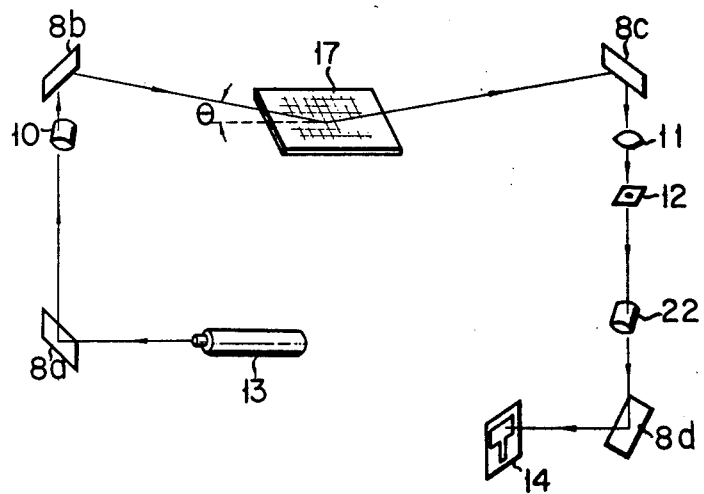
FIG. 11 is a detail view showing a laser optical system shown in FIG. 10.

Referring now to FIG. 11, there will be described the laser optical system used in this embodiment.

Like the case of the aforementioned embodiment, the beam delivered to the sample surface 17 through the incidence optical system is positively reflected on the surface 17, and falls upon the slit 14 through the spherical lens 11, slit 12, cylindrical lens 22, and the reflector 8d in order, getting its optical path changed by the reflector 8c. Meanwhile, the beam is shaped into a very narrow flat beam by the spherical lens 11 and cylindrical lens 22. The slit 12 with a pinhole-like opening, which is interposed between the spherical lens 11 and cylindrical lens 22, is used for raising S/N of the output signal, except for the light other than the positively reflected beam components from the sample surface 17.

Figure 12:
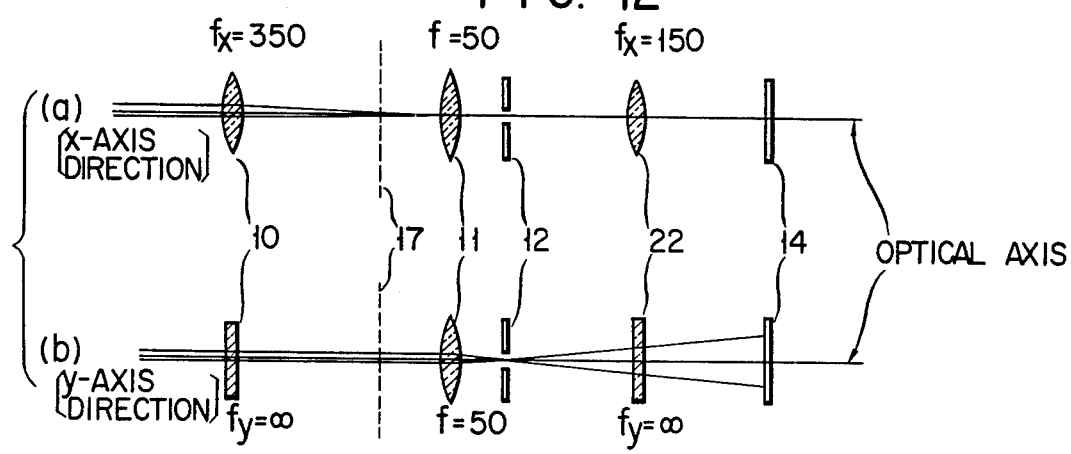
FIG. 12 shows the positional relation between the several elements of the optical system of FIG. 11 and the manner of change of a laser beam.

Referring now to FIG. 12, there will be described an example of the positional relation between the several elements of the aforesaid optical system as well as the manner of change of the laser beam. (a) illustrates the elements along the x-axis direction perpendicular to the optical axis, while (b) illustrates along the y-axis direction perpendicular to each of the optical axis and the x-axis. In this Figure, the reflectors 8a, 8b, 8c and 8d are not shown for the simplicity of illustration, and the sample surface 17 and the reflection thereon are simplified. In these arrangements, the lenses 10, 11 and 22 are so located as to meet the following requirements as much as possible.

(a) The beam is to be stopped down in the vicinity of the slit 12 by means of the lenses 10 and 11.

(b) The beam is to be stopped down by the slit 14 with respect to the x-axis direction. That is, the light incident surface is placed on the focussing plane of the lens 22 with respect to the x-axis direction.

(c) The beam is to be expanded as wide as possible on the slit 14 with respect to the y-axis direction.

(d) The shift distance of the beam on the slit 14 accompanying the shift of the sample surface 17 should be as large as possible.

If the respective focal distances of the lenses as well as the distances between the elements are so determined as to fulfill all these requirements, then the x-axis direction focal distance fx of the cylindrical lens 10 may be 350 mm, the y-axis direction focal distance fy of the same is infinite, the focal distance of the spherical lens 11 is 50 mm, the x-axis direction focal distance fx of the cylindrical lens 22 is 150 mm, the y-axis direction focal distance fy of the same is infinite, the distance between the cylindrical lens 10 and the focal position on the sample surface 17 is 220 mm, the distance between the sample surface 17 and the cylindrical lens 11 is 108 mm, and the distance between the cylindrical lens 22 and the slit 14 may be 150 mm, for example. Further, the slit 12 is located correspondingly to a focal distance determined by combining the cylindrical lens 10 with the spherical lens 11 (this composite focal distance is substantially equal to the focal distance of the spherical lens 11 because fx of the cylindrical lens 10 is long enough). It is to be understood that the locations of (or distances between) the elements are given only by way of example, and that they may be determined suitably in connection with the focal distances of the lenses used. Thus, by locating the lenses 10, 11 and 20, sample surface 17, and the slits 12 and 14, a very narrow, linear flat beam is allowed to be incident upon the slit 14 with a T-shaped opening.

Figure 13:
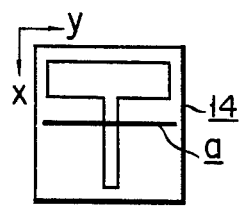
FIG. 13 shows a slit used in the optical system of FIG. 11 and the laser beam incident upon the slit.

FIG. 13 shows the shape of the slit 14 and the way the flat beam is incident upon the slit 14. As shown in this Figure, the slit 14 is provided with a T-shaped opening with a wide horizontal portion and a narrow vertical portion.

In FIG. 13, a indicates the shape of the laser beam incident upon the plane of the slit 14. The flat beam obtained by means of the optical system as shown in FIG. 12 falls upon the plane of the slit 14 in a flat shape as indicated by a.

Figure 14:
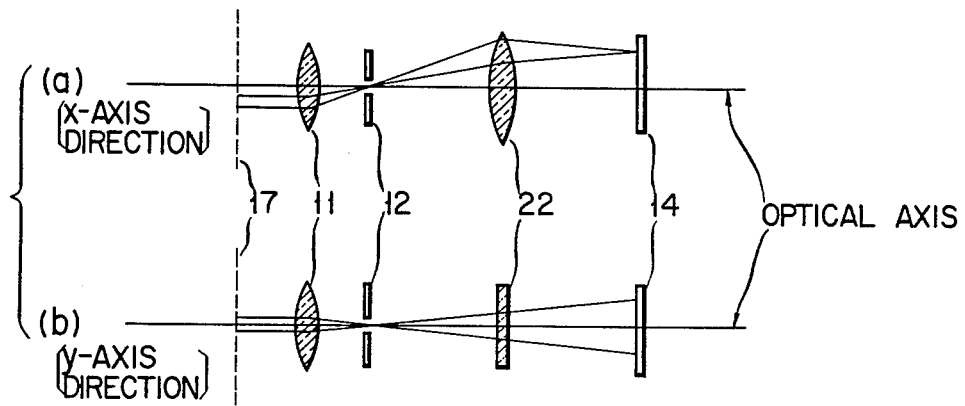
FIG. 14 is a diagram corresponding to FIG. 12, in which the sample is shifted in the vertical direction.

Referring now to FIG. 14, there will be described a case where the sample surface 17 is shifted downward as in FIG. 11. Vertical shifting of the sample surface 17 means that the reflected beam from the sample surface 17 falls upon the spherical lens 11 at a position deviated in the x-axis direction. Further, the reflection, from the sample surface 17, of the beam incident upon the spherical lens 11 passes through the several elements and falls upon the slit 14, as shown in FIG. 14. That is, the incidence position on the slit 14 varies from that of FIG. 12 only with respect to the x-axis direction.

Figure 15:
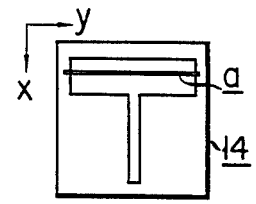
FIG. 15 is a diagram corresponding to FIG. 13 showing the manner of shifting of the laser beam incident upon the photo-sensor member in response to the shift of the sample as shown in FIG. 14.

FIG. 15 shows how the flat beam falls upon the slit 14 in the state of FIG. 14. As shown in this Figure, the flat beam indicated by a is located in the horizontally extending wide portion of the opening.

Turning now to FIG. 10, the position of the flat beam incident upon the plane of the slit 14 is shifted parallelly as the sample surface 17 or the stage 4 moves vertically in the direction of the arrow 18. If the flat beam falls upon the vertically extending narrow opening portion of the slit 14, the slit 14 will pass a relatively small quantity of light. If the flat beam is incident upon the horizontal opening portion, however, the slit 14 will pass a large quantity of light. The light passed through the slit 14 is detected and converted into an electrical signal corresponding to the quantity of light received by the photo-sensor 15 disposed opposite to the back of the slit 14.

Figure 16:
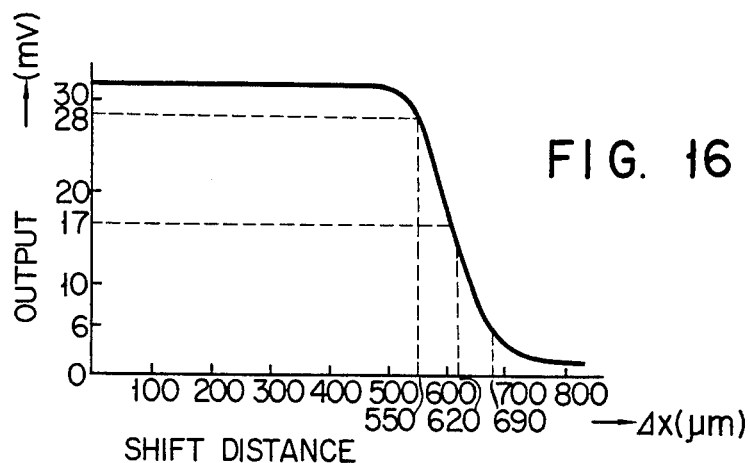
FIG. 16 shows the relation between the sample shift distance and the photo-sensor output.

FIG. 16 shows the relation between the vertical shift distance of the sample surface 17 and the output of the photo-sensor 15. The axis of abscissa represents the shift distance $\Delta x$, while the axis of ordinate stands for the voltage of the output signal. As may be seen from this Figure, the output of the photo-sensor 15 changes drastically with high linearity in a section where $\Delta x$ ranges from 550 to 690 $\mu m$. Accordingly, with the reference value of $\Delta x$ set at 620 $\mu m$ (with the photo-sensor output at 17 mV), the output of the photo-sensor 15 will vary substantially linearly within ±11 mV from 17 mV if a shift (focal deviation) of ±70 $\mu m$ from the reference position is caused. The sensitivity S of such focal deviation is $$S = \frac{\text{Variation of output voltage}}{\text{Max. allowable shift distance } \Delta x}$$

$$= \frac{28 - 6}{690 - 550} = \frac{22}{140} = 0.157 \text{ (mV/}\mu\text{m)},$$

and thus the focal deviation may be detected fully to the micron order.

The electrical signal thus obtained by means of the photo-sensor 15 is applied to the electric circuit 16.

In the above-mentioned construction, when the base 19 is shifted for the shift of the visual field of the microscope, involving a focal deviation, the output voltage of the photo-sensor 15 varies in accordance with the characteristic as shown in FIG. 16, and as a result an output corresponding to the variation is produced from the electric circuit 16. Then, the output of the electric circuit 16 is supplied to the four jacks 6a to 6d as shown in FIG. 10, which operate to shift the stage 4 upward or downward over a predetermined distance in response to the supplied output.

Figure 17:
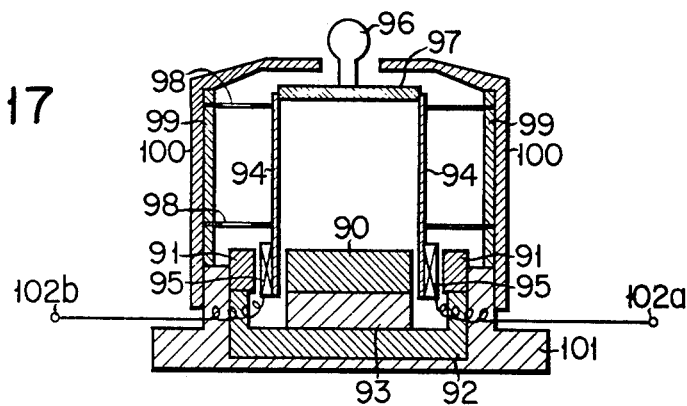
FIG. 17 is a sectional view of a jack for vertically shifting the stage of the apparatus of FIG. 10.

FIG. 17 is a sectional view of an example of the jacks 6a to 6d. In this Figure, there are shown cores 90, 91 and 92, a permanent magnet 93, a bobbin 94, and a coil 95 wound on the bobbin 94. A covering 97 with a projection 96 is fixed to the top portion of the bobbin 94, and the bobbin 94, projection 96 and covering 97 form a shiftable member. Further, metal-sheet-like support members 98 are fitted in two portions of the side of the bobbin 94. Inner side of each support member 98 is fixed to the bobbin surface, while outer side is fixed to the inside wall surface of an inner barrel 99. Numerals 100 and 101 designate an outer barrel and a support for supporting the whole body of the jack, respectively.

According to thus constructed jack, when the coil 95 is energized from outside the jack through lead wires 102a and 102b, the coil 95 (or the bobbin 94) moves in the vertical direction by the effect of electromagnetic induction. Accordingly, the covering 97 with the projection 96 also moves in the vertical direction. Since the bobbin 94 is guidingly supported by the two support members 98, the coil 95 may move up and down between the cores 90 and 91 without coming in contact therewith.

Figure 18:
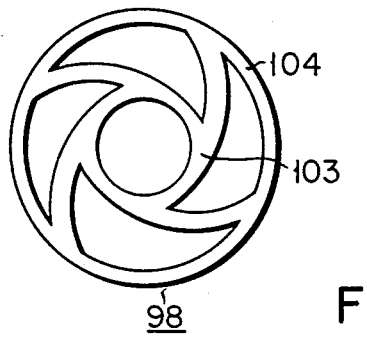
FIG. 18 is a plan view of a support member used with the jack of FIG. 17.

FIG. 18 shows an example of the support member 98. As is clear from this Figure, the support member 98 has a plurality of radially extending arms connected to inner and outer peripheral circular portions 103 and 104, which may easily be formed by striking e.g. a thin phosphor bronze sheet into the shape as illustrated. The inner peripheral portion 103 of the support member 98 is fixed to the bobbin 94 by using a resin adhesive, whereas the outer peripheral portion 104 is fitted in a portion of the inner barrel 99, as shown in FIG. 17.

As shown in FIG. 10, the stage 4 is mounted on the projection 96 of the jack as shown in FIG. 17. Therefore, the back side of the stage 4 is provided with a round or tapered recess to catch the projection 96 of the jack.

Thus, when the output signal of the electric circuit is applied with the stage 4 mounted on the jacks 6a to 6d, the projections of the jacks 6a to 6d move at the same time to shift the stage 4 upward or downward until the focus is placed on the sample surface 17.

Figure 19A:
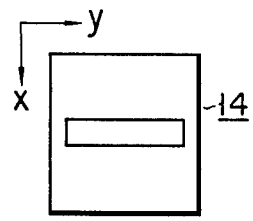
FIGS. 19A to 19C are the respective front views of varied examples of the slit used in the optical system.
Figure 19B:
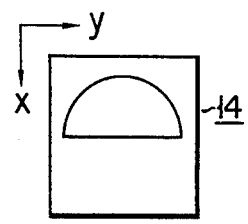
Figure 19C:
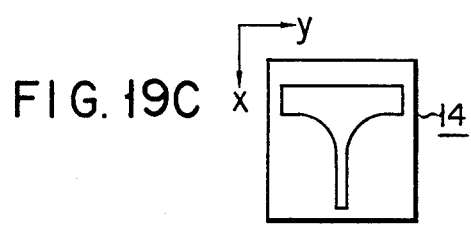

In the above-mentioned embodiment, the vertical shifting of the stage is performed by means of an output corresponding to the quantity of light passing through the slit with a T-shaped opening (refer to FIG. 16 for the relation between the output and the shift). However, the shape of the slit 14 is not limited to the one used in the aforesaid embodiment, and various other shapes are available. FIGS. 19A to 19C show varied examples of the shape of the slit 14. FIG. 19A shows a slit with a horizontally extending rectangular opening, and FIG. 19B shows a slit with a semicircular opening. Where these slits are used, the transitional portion of the characteristic curve of FIG. 16 becomes steeper, ensuring higher sensitivity shift detection. Further, FIG. 19C shows a slit with an opening which partially includes a narrow portion defined by a hyperbolic curve. The slit of this shape may effectively be used where the output of the photo-sensor 15 is expected to be in the logarithmic mode. Also available is a slit with a partially triangular opening (not shown) for improved linearity of the output characteristic of the photo-sensor. Thus, the opening of the slit 14 may be of any suitable shape that is selected according to the application and the sensitivity of the photo-sensor.

Like the one according to the first embodiment, the apparatus of the aforementioned second embodiment may enjoy a simple construction as well as improved operation efficiency.

What is claimed is:

1. An automatic focusing apparatus for focusing a lens system for the observation of a sample placed on a stage on the surface of said sample, comprising: a collimated beam source; an incident optical means for leading a collimated beam from said collimated beam source to said sample surface at a predetermined inclined incident angle in an incident pattern, said incident pattern having a flattened shape; photosensitive means to produce an electric signal corresponding to the intensity of light received; a reflection optical means for receiving the collimated beam reflected from said sample surface, said reflection optical means including an imaging lens means for imaging an image of said incident pattern on said photosensitive means; a detecting means for detecting a shift distance of said sample in the direction of the thickness thereof by means of the electric signal from said photosensitive means and for producing a signal corresponding to said shift distance; and shift means for shifting said stage in the direction of the thickness of said sample by means of a signal from said detector means to focus said lens system on said sample surface, wherein said automatic focusing apparatus is optically separate from said lens system.

2. An automatic focusing apparatus according to claim 1, wherein said incident optical means includes a cylindrical lens for flattening the collimated beam to render said collimated beam incident upon the sample surface.

3. An automatic focusing apparatus according to claim 1, wherein the imaging lens means of said reflection optical means includes a spherical lens for imaging the point, where said incident collimated beam intersects said sample surface, onto said photosensitive means.

4. An automatic focusing apparatus according to claim 1, wherein said reflection optical means includes a beam splitter means for dividing the reflected collimated beam into two beams, said photosensitive means includes a pair of photosensitive members for severally receiving said bisected beams, and said detector means includes an electric circuit for detecting the difference between the respective outputs of said pair of photosensitive members for and supplying a signal corresponding to said difference to said shift means.

5. An automatic focusing apparatus according to claim 4, wherein said beam splitter includes a pair of reflectors arranged at predetermined angles so as to reflect part of the incident beam at each fixed angle, and said pair of photosensitive members include a pair of photo diodes to receive the respective reflected beams from said reflectors.

6. An automatic focusing apparatus according to claim 1, wherein the imaging lens of said reflection optical means includes a cylindrical lens for flattening the reflected collimated beam from the sample and a slit with an opening of a predetermined shape for passing toward said photosensitive means a portion of said flattened collimated beam corresponding to the incidence position thereof.

7. An automatic focusing apparatus according to claim 6, wherein the opening of said slit is T-shaped.

8. An automatic focusing apparatus according to claim 6, wherein the opening of said slit is narrow and rectangular.

9. An automatic focusing apparatus according to claim 6, wherein the opening of said slit is semicircular.

10. An automatic focusing apparatus according to claim 6, wherein the opening of said slit is hyperbolic, and is defined at each end.

11. An automatic focusing apparatus according to claim 1, wherein said detector means includes a member for setting a reference value for signals and a member for comparing said reference value with the electric signal from said photosensitive means and for producing a signal corresponding to the difference between the values.

12. An automatic focusing apparatus according to claim 1, wherein said shift means includes a servomotor driven by the signal from said detector means and a driving mechanism for vertically shifting said stage accompanying the drive of said servomotor.

13. An automatic focusing apparatus according to claim 1, wherein said shift means includes a coil excited by the signal from said detector means and shiftable members disposed on the bottom face of said stage and vertically shifted by the excitation of said coil.

14. An automatic focusing apparatus according to claim 1, wherein said inclined incident angle is 3° to 10° with reference to the surface of the sample.

15. An automatic focusing apparatus for focusing a lens system onto the surface of a sample placed on a stage, comprising:

a laser beam source;

incident optical means for forming an optical pattern of light from a laser beam received from said laser beam source and for directing said optical pattern onto the surface of said sample, said optical pattern of light having a flattened shape, said optical pattern being incident on the surface of said sample at a predetermined angle of incidence, said predetermined angle of incidence lying between 3° and 10° relative to the surface of said sample;

photosensitive means for producing an electric signal which corresponds to the intensity of light received by said photosensitive means;

reflection optical means for receiving the optical pattern of light reflected from the surface of said sample and for forming an image of said reflected optical pattern on said photosensitive means;

detector means coupled to receive the electric signal from said photosensitive means for detecting a shift in position of said sample in the direction of thickness of said sample and for producing a signal proportional to the amount of said shift in position; and means for moving said stage in the direction of thickness of said sample under control of said signal from said detector means;

wherein the surface of said sample is maintained at a constant distance from said lens system such that the focus of said lens system onto the surface of said sample is automatically maintained, said automatic focusing apparatus being optically separate from said lens system.

* * * * *